United States Patent
Takano et al.

(10) Patent No.: US 6,194,071 B1
(45) Date of Patent: *Feb. 27, 2001

(54) CARBON FIBER BALL AND A PROCESS FOR MANUFACTURING THE SAME

(75) Inventors: Katsuto Takano, Tokyo; Yukihiro Shibuya, Fukushima, both of (JP); Gerard Palmarole, Basel (CH)

(73) Assignee: Kureha Chemical Industries Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,345

(22) Filed: Jan. 8, 1999

(51) Int. Cl.$^7$ .................... B32B 9/00; D01F 9/12
(52) U.S. Cl. .............. 428/408; 428/367; 423/447.1; 423/447.3
(58) Field of Search .................. 428/408, 367; 423/447.1, 447.3

(56) References Cited

U.S. PATENT DOCUMENTS

| | | | |
|---|---|---|---|
| 4,669,887 | * 6/1987 | Lee | 366/155 |
| 4,953,135 | * 8/1990 | Lee | 366/155 |
| 5,456,897 | * 10/1995 | Moy et al. | 423/447.3 |
| 5,489,477 | * 2/1996 | Ohta et al. | 428/408 |
| 5,641,572 | * 6/1997 | Yoshimura et al. | 428/408 |
| 5,691,054 | * 11/1997 | Tennent et al. | 428/359 |
| 5,707,916 | * 1/1998 | Synder et al. | 502/180 |
| 5,846,658 | * 12/1998 | Tennent et al. | 428/408 |
| 5,968,650 | * 10/1999 | Tennent et al. | 428/367 |

FOREIGN PATENT DOCUMENTS

| | | |
|---|---|---|
| 37 36 215 | 5/1989 | (DE). |
| 0 882 558 A1 | 12/1998 | (EP). |
| 4-024259A | 1/1992 | (JP). |
| 4-024259 | * 1/1992 | (JP). |
| WO 96/04416 | 2/1996 | (WO). |

OTHER PUBLICATIONS

Database WPI Week 9250 Derwent Publications Ltd., London, GB; AN 92–409537 XP002076385 & JP 04 300 353 A (Mitsui Lozan KK), Oct. 23, 1992 *abstract* *col. 4, line 21—line 32*.
Patent Abstracts of Japan vol. 018, No. 517 (C–1254), Sep. 29, 1994 & JP 06 173150 A (Kaname:KK), Jun, 21, 1994 *abstract*.
Database WPI Week 9211 Derwent Publications Ltd., London, GB; AN 92–352256 XP002076386 & JP 04 024 259 A (Asahi Chem Ind Co Ltd), Jan. 28, 1992 *abstract; table 2*.
Patent Abstracts of Japan vol. 12, No. 229 (M–714), Jun. 29, 1988 & JP 63 027207 A (Kawasaki Steel Corp), Feb. 4, 1988 *abstract*.
Patent Abstracts of Japan vol. 97, No. 6, d0 Jun. 1997 & JP 09 029082 A (Ask Tekunika:KK), Feb. 4, 1997 *abstract*.
Patent Abstracts of Japan vol. 14, No. 227 (C–0718), May 15, 1990 & JP 02 055786 A (Kuraray Co LTE), Feb. 26, 1990 *abstract*.

* cited by examiner

Primary Examiner—William Krynski
Assistant Examiner—J. M. Gray
(74) Attorney, Agent, or Firm—Nixon & Vanderhye P.C.

(57) ABSTRACT

Carbon fiber balls which enable quantitative, consistent supply into, for example, an extruder and also facilitate uniform dispersion of carbon fibers in the matrix of a resin by use of, for example, an extruder; as well as a process for the manufacture of the carbon fiber balls. The carbon fiber balls are constructed of short carbon fibers and a binder, and have a bulk density of 0.05–0.15 g/cm$^3$. The process includes the steps of filling a mixer with short carbon fibers, the mixer having a hollow cylindrical container which is disposed substantially horizontally and a plurality of flat blades and a plurality of rake-shaped vanes disposed therein for rotating about the axis of the cylindrical container; rotating the flat and rake-shaped vanes simultaneously for a predetermined time; adding a binder to the contents of the mixer; and then rotating the flat blades for a predetermined time.

9 Claims, No Drawings

CARBON FIBER BALL AND A PROCESS FOR MANUFACTURING THE SAME

BACKGROUND OF THE INVENTION

1. Field of the Invention

The present invention relates to a carbon fiber ball which is suitably used in the manufacture of composite materials containing carbon fibers and resin compounds containing carbon fibers, as well as a process for preparing the carbon fiber ball.

2. Background of the Invention

For the purpose of improving mechanical properties, electric characteristics, sliding performance, and other characteristics of a resin, carbon fibers are added to and compounded with the resin, and the thus-obtained composite materials have found wide utility. One known method for manufacturing such composite materials involves the continuous supply of a resin and short carbon fibers having a length of about 3–10 mm to a molding machine such as an extruder so as to attain uniform dispersion of the short carbon fibers in the resin matrix inside the molding machine, to thereby form a composite material in a continuous manner. Short carbon fibers interlaced in a complicated manner, such as pitch short carbon fibers manufactured by centrifugal spinning, are difficult to supply in quantity to a molding machine, such as an extruder, because their small bulk density prevents them from satisfactorily affording into an extruder from a hopper or from a supply means attached to a hopper. In such a case, there is employed a method in which a master batch is manufactured in advance by mixing a resin and short carbon fibers by use of a batch-type kneader, and the thus-obtained master batch is mixed with a resin to be molded. This method requires an extra step of manufacturing a master batch, and also has a drawback that continuous manufacturing cannot be performed.

In order to solve this problem, there is proposed a method in which short fibers are introduced into a swirling air stream so as to bring them to closely aggregate into a spherical shape having a diameter of 10 mm or less and a bulk density of 0.04–0.15 g/cm$^3$; the resultant fibrous balls are mixed with a thermoplastic resin (powder or pellets); and then the mixture is kneaded at a temperature of not lower than the melting point of the thermoplastic resin (see Japanese Patent Application Laid-Open (kokai) No. 63-27207). However, this method is disadvantageous in that closely aggregated carbon fibers are interlaced in a complicated manner, to thereby prevent their uniform dispersion in the resin matrix during kneading.

Accordingly, the present invention is directed to a carbon fiber ball which permits a quantitative and stable supply of carbon fibers to an extruder or the like and enables the carbon fibers to be uniformly dispersed in the matrix of the resin with ease, as well as to a method of manufacturing the fiber ball.

SUMMARY OF THE INVENTION

The inventors of the present invention have conducted careful studies so as to attain uniform dispersion of short carbon fibers in the matrix of a resin by use of an extruder, and have found that the above-mentioned problem is satisfactorily solved by impregnating the short carbon fibers with a binder. The present invention was accomplished based on this finding.

According to a first aspect of the present invention, there is provided a carbon fiber ball comprising short carbon fibers and a binder, wherein the carbon fiber ball has a bulk density of 0.05–0.15 g/cm$^3$. According to a second aspect of the present invention, there is provided a carbon fiber ball comprising short carbon fibers, a resin powder, and a binder, wherein the carbon fiber ball has a bulk density of 0.05–0.15 g/cm$^3$.

The carbon fiber balls according to the first or second aspect of the present invention smoothly leave a hopper—or a supply means attached to the hopper—to enter an extruder with ease, because they have a generally spherical shape and a large bulk density, and therefore allow a quantitative and stable supply of the carbon fibers to an extruder or the like. In addition, the binder binds a short carbon fibers to another short carbon fibers or to resin powder so as to prevent breaking up of the carbon fiber ball, or to prevent detachment of the carbon fibers and resin powder from the carbon fiber balls. Moreover, the binder serves as a lubricant and improves sliding between short carbon fibers, to thereby cause the uniform dispersion of short carbon fibers in the resin matrix with ease in the process of dispersing the short carbon fibers in the resin matrix by kneading the carbon fiber balls and resin by use of an extruder or the like.

The resin powder of the second aspect of the present invention is present within and/or outside generally spherical balls formed of short carbon fibers interlaced with one another and increases the bulk density of the carbon fiber ball. In addition, the resin powder facilitates uniform dispersal of the short carbon fibers in the resin matrix when the carbon fiber balls and resin are kneaded.

The carbon fiber ball of the first aspect of the present invention may be manufactured by a process comprising the steps of filling a mixer with short carbon fibers, the mixer having a hollow cylindrical container which is disposed substantially horizontally and a plurality of flat blades and a plurality of rake-shaped vanes disposed therein for rotating about a horizontal axis of the cylindrical container as a common axis of rotation; rotating the flat and rake-shaped vanes simultaneously; adding a binder to the contents of the mixer; and then rotating the flat blades to form the carbon fiber ball. In the meantime, the carbon fiber ball of the second aspect of the present invention may be manufactured by a process comprising the steps of filling a mixer with short carbon fibers, the mixer having a hollow cylindrical container which is disposed substantially horizontally and a plurality of flat blades and a plurality of rake-shaped vanes disposed therein for rotating about a horizontal axis of the cylindrical container as a common axis of rotation; rotating the flat and rake-shaped vanes simultaneously; adding a binder to the contents of the mixer; rotating the flat blades; further adding a resin powder to the contents of the mixer; and rotating the flat blades to form the carbon fiber ball.

DETAILED DESCRIPTION OF THE PREFERRED EMBODIMENT

The carbon fiber ball of the first aspect of the present invention comprises short carbon fibers and a binder and has a bulk density of 0.05–0.15 g/cm$^3$. The carbon fiber ball of the second aspect of the present invention comprises short carbon fibers, a resin powder, and a binder, and has a bulk density of 0.05–0.15 g/cm$^3$. The carbon fiber ball of the first or second aspect of the present invention preferably has a diameter of 3–15 mm. Carbon fiber balls larger or smaller than the above size are poorly forwarded into an extruder from a hopper or from a supply means attached to a hopper, and make a quantitative, continuous supply of short carbon fibers difficult. The carbon fiber ball preferably has a diameter of 3–15 mm, more preferably 5–13 mm, and still more preferably 7–10 mm. At least 80% by weight carbon fiber balls should fall within the above-mentioned range of diameters of the fiber carbon ball, wherein the diameter of an individual carbon fiber ball refers to the largest value among those measured in various directions.

The short carbon fibers preferably have a length of 130 mm, more preferably 2–20 mm, and still more preferably 310 mm. Short carbon fibers having a length of 1 mm or less have insufficient interlacing of carbon fibers, and therefore easily break up and encounter difficulty in maintaining their shape. Carbon fibers having a length of 30 mm or more are difficult to form in a spherical shape.

No limitation is imposed on the diameter of the short carbon fiber, but short carbon fibers having a diameter of 5–30 µm are generally used.

With pitch-derived carbon fibers which are manufactured by centrifugal spinning, or with vapor-phase epitaxial carbon fibers manufactured by vapor phase epitaxy, it is difficult to increase the bulk density by aligning these fibers in one direction and causing them to aggregate. Therefore, the effect of the present invention is particularly prominent when the above-mentioned pitch-derived carbon fibers and vapor-phase epitaxial carbon fibers are used. However, the carbon fibers are not limited to only these types of carbon fibers.

The resin powder which serves as one constituent of the carbon fiber ball of the second aspect of the present invention is preferably identical to the resin to which the carbon fiber ball is added so as to manufacture a resin composite. However, in the case in which a small amount of another type of resin is permitted to be present, such other type of resin may be selected from among a variety of types of resins.

Examples of the resin powder include, but are not limited to, a thermoplastic resin such as polyamide (PA6, PA66, PA46, PA11, PA12, etc.), polyphenylene sulfide (PPS), polyether-ether-ketone (PEEK), polyoxymethylene (POM), polyethylene terephthalate (PET), polybutylene terephthalate (PBT), polycarbonate (PC), polyethylene (PE), polypropylene (PP), ABS, or polyvinyl chloride (PVC) and a thermosetting resin such as an epoxy resin, a urethane resin, a phenolic resin, or polyimide. The thermosetting resin which is uncured, half-cured (B stage), and cured may be used.

The resin powder preferably has a grain size of 100–800 µm. When the grain size is excessively small, the powder has poor effect of increasing the bulk density of the carbon fiber ball, whereas when it is excessively large, homogeneous retention of the powder in the carbon fiber balls may become difficult. The size of the resin powder is therefore preferably 100–800 µm, more preferably 150–750 µm, still more preferably 200–700 µm.

The binder is introduced by impregnation into spaces between short carbon fibers so as to bind the fibers to one another or to the resin powder so as to prevent breaking-up of the carbon fiber balls and release of the adhered resin powder therefrom during storage, transportation, or handling of the carbon fiber balls for feed to a hopper. Also, the binder works as a lubricant to decrease inter-fiber friction during the step of dispersing the carbon fiber into the matrix of the resin, to thereby facilitate homogeneous dispersion of the short carbon fibers into the resin matrix.

The binder must be in a liquid or molten state at the temperature at which the carbon fiber balls are kneaded along with a resin so as to disperse the carbon fibers into the matrix of the resin. Binders which are solid at ambient temperature, i.e., about 5–35° C., are converted to a liquid state by heating an apparatus for manufacturing carbon fiber balls as well as the binder itself before it is used in the manufacture of carbon fiber balls. Alternatively, binders which are solid at the temperature of the manufacture of carbon fiber balls may be used after being pulverized into a finely divided powder to obtain carbon fiber balls, and the resultant carbon fiber balls may subsequently be melted by the application of heat at the melting point of the binder or a higher temperature so as to bind the short carbon fibers to one another or to the resin powder.

Also, binders which have a high viscosity or are solid at ambient temperature may be used after being dissolved in a solvent such as benzene, hexane, acetone, chloroform, methyl alcohol, ethyl alcohol, or water; and, after manufacture of carbon fiber balls, the solvent is evaporated. The solvent used in this case preferably has excellent solubility to the binder and a boiling point of 100° C. or less. The binder is particularly preferably liquid at ambient temperature, i.e., about 5–35° C. When the binder is solid at ambient temperature, the melting point is 150° C. or less, preferably 100° C. or less. The binder preferably has compatibility to a resin (host polymer) to which carbon fiber balls are added.

Examples of binders which may be used in the present invention include a variety of additives for plastics which are in a liquid state or are easily melted by the application of heat to become low-viscosity liquids. Specific examples include the following.

Plasticizers: A phthalate ester plasticizer such as dimethyl phthalate (DMP), diethyl phthalate (DEP), dibutyl phthalate (DBP), diheptyl phthalate (DHP), dioctyl phthalate (DOP), diisononyl phthalate (DINP), diisodecyl phthalate (DIDP), ditridecyl phthalate (DTDP), butylbenzyl phthalate (BBP), or a tetrahydrophthallate ester; a phosphate ester plasticizer such as tricresyl phosphate (TCP), triethyl phosphate (TEP), tributyl phosphate (TBP), tris(2-ethylhexyl) phosphate (TOP), tri(chloroethyl) phosphate (TCEP), tris (dichloropropyl) phosphate (CRP), tributoxyethyl phosphate (TBXP), tris(β-chloropropyl) phosphate (TMCPP), triphenyl phosphate (TPP), octyl diphenyl phosphate, tris (isopropylphenyl) phosphate, or cresyl diphenyl phosphate (CDP)); an aliphatic polyvalent carboxylate ester plasticizer such as an adipate diester (dioctyl adipate (DOA), diisononyl adipate (DINA), diisodecyl adipate (DIDA), dibutyl glycol adipate (BXA), etc.), an azelate diester (dioctyl azelate (DOZ), etc.), a sebacate diester (dibutyl sebacate (DBS), dioctyl sebacate (DOS), etc.), a citrate triester (acetyltriethyl citrate (ATEC), acetyltributyl citrate (ATBC), etc.), a maleate diester (dibutyl maleate (DBM), di(2-ethylhexyl) maleate (DOM), etc.), or a fumarate diester (dibutyl fumarate (DBF), etc.); an aromatic polyvalent carboxylate ester plasticizer such as a trimellitate ester and a pyromellitate ester; a polyester plasticizer; an epoxy compound plasticizer; a stearic acid plasticizer; and chlorinated paraffin.

Stabilizers: An organic tin compound stabilizer such as a di-n-octyltinbis(isooctyl thioglycolate ester) salt, a di-n-octyltin maleate polymer, di-n-octyltin dilaulate, a di-n-octyltin maleate ester salt, a di-n-butyltin bismaleate ester salt, a di-n-butyltin maleate polymer, a di-butyltin bis(octyl thioglycolate ester) salt, a di-n-butyltin β-mercaptopropionate salt polymer, a di-n-butyltin dilaurate, or a di-n-methyltin bis(isooctylmercaptoacetate) salt.

Antioxidants: A phenolic compound antioxidant such as 2,6-di-t-butyl-p-cresol, butylated hydroxyanisole (BHA), 2,6-di-t-butyl-4-ethylphenol, stearyl-β-(3,5-di-t-butyl-4-hydroxyphenyl) propionate, 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis (3-methyl-6-t-butylphenol), 1,1,3-tris(2-methyl-4-hydroxy-5-t-butylpheyl)butane, 1,3,5-trimethyl-2,4,6-tris(3,5-di-t-butyl-4-hydroxybenzyl)benzene, tetrakis [methylene-3-(3', 5'-di-t-butyl-4-hydroxyphenyl)propionate]methane, bis[3, 3'-bis(4'-hydroxy-3'-t-butylphenyl)butyric acid] glycol ester, or tocopherol(s); a sulfur compound antioxidant such as dilauryl 3,3'-thiodipropionate, dimyristyl 3,3'-thiodipropionate, or distearyl 3,3'-thiodipropionate; and a phosphite ester antioxidant such as triphenyl phosphite, diphenyl isodecyl phosphite, phenyl diisodecyl phosphite, 4,4'-butylidene-bis(3-methyl-6-t-butylphenylditridecyl) phosphite, cyclic neopentanetetraylbis(octadecyl phosphite), tris(nonylphenyl) phosphite, diisodecyl pentaerythritol diphosphite, 9,10-dihydro-9-oxa-10-phosphaphenanthrene-10-oxide, or 2,2'-methylenebis(4,6-di-t-butylphenyl)octyl phosphite.

UV-absorbers: A salicylate UV-absorber such as p-t-butylphenyl salicylate; a benzophenone UV-absorber such as 2-hydroxy-4-methoxybenzophenone, 2-hydroxy-4-octoxybenzophenone, or 2,2'-dihydroxy-4-methoxybenzophenone; and a benzotriazole UV-absorber such as 2-(2'-hydroxy-5'-methylphenyl)benzotriazole or 2-(2'-hydroxy-3'-t-butyl-5'-methylphenyl)-5-chlorobenzotriazole.

Antistatic agents: A nonionic, anionic, cationic, and amphoteric antistatic agent such as a polyoxyethylene alkylamine, a polyoxyethylene alkylamide, a polyoxyethylene alkyl ether, a polyoxyethylene alkylphenyl ether, a glycerin fatty acid ester, a sorbitan fatty acid ester, an alkyl sulfonate, an alkylbenzene sulfonate, an alkyl sulfate, or an alkyl phosphate.

Flame-retardants: A halogen compound flame-retardant such as tetrabromobisphenol A (TBA), 2,2-bis(4-hydroxy-3,5-dibromophenyl)propane, or chlorinated paraffin; and a phosphate frame-retardant such as tricresyl phosphate (TCP), triethyl phosphate (TEP), or tris(β-chloroethyl) phosphate (TCEP).

Lubricants: An aliphatic hydrocarbon lubricant such as liquid paraffin having 16 or more carbon atoms, natural paraffin, or a polyolefin wax and a partial oxide, a fluoride, a chloride, etc. thereof; lubricants of higher aliphatic alcohols or higher fatty acids having 16 or more carbon atoms; aliphatic amide lubricants such as higher fatty acid amides and bisamides having 16 or more carbon atoms; and a metallic soap lubricant such as stearate of barium, calcium, zinc, aluminum, or magnesium.

When the above-described additives for plastics are incorporated as the binder, the additives impart a variety of functions to a composite manufactured by the incorporation of carbon fiber balls into a resin. Further examples of the binder include a low-molecular-weight polymer such as low-molecular-weight polyethylene (polyethylene wax), low-molecular-weight polypropylene, or a cumarone plastic; and a liquid resin such as a liquid polyester resin, a liquid epoxy resin, or a liquid phenolic resin.

Moreover, examples of the binder include a silane or titanate coupling agent; mineral oil (liquid hydrocarbon from petroleum); animal fat and oil; and vegetable fat and oil; and biphenyl, terphenyl, and alkylnaphthalenes.

The carbon fiber ball of the first aspect of the present invention preferably contains 100 parts by weight of short carbon fiber and 20–60 (more preferably 30–50) parts by weight of a binder. The carbon fiber ball of the second aspect of the present invention preferably contains 100 parts by weight of short carbon fiber, 20–60 (more preferably 30–50) parts by weight of a binder, and 20–60 (more preferably 30–50) parts by weight of a resin powder.

The carbon fiber balls of the present invention may be manufactured by, for example, the following process.

The carbon fiber balls of the first aspect of the present invention may be manufactured by a process comprising the steps of filling a mixer with short carbon fibers, the mixer having a hollow cylindrical container which is disposed substantially horizontally and a plurality of flat blades and a plurality of rake-shaped vanes disposed therein for rotating about a horizontal axis of the cylindrical container as a common axis of rotation; rotating the flat and rake-shaped vanes simultaneously for a predetermined time (preferably 10–120 minutes, more preferably 20–90 minutes); adding a binder to the contents of the mixer; and then rotating the flat blades for a predetermined time (preferably 1–30 minutes, more preferably 5–20 minutes) to form the carbon fiber balls.

Also, the carbon fiber balls of the second aspect of the present invention may be manufactured by a process comprising the steps of filling a mixer with short carbon fibers, the mixer having a hollow cylindrical container which is disposed substantially horizontally and a plurality of flat blades and a plurality of rake-shaped vanes disposed therein for rotating about a horizontal axis of the cylindrical container as a common axis of rotation; rotating the flat and rake-shaped vanes simultaneously for a predetermined time (preferably 10–120 minutes, more preferably 20–90 minutes); adding a binder to the contents of the mixer; rotating the flat blades for a predetermined time (preferably 1–30 minutes, more preferably 5–20 minutes); further adding a resin powder to the contents of the mixer; and rotating the flat blades for a predetermined time (preferably 0.2–10 minutes, more preferably 0.5–5 minutes) to form the carbon fiber balls.

In a mixer having the above-described structure preferably used in the manufacture of the carbon fiber balls of the present invention, the flat blades have a main function of imparting short carbon fibers with a spherical shape and they are preferably disposed such that each blade is attached to the axis for rotation at an approximate right angle. The rake-shaped vanes have a function of feeding to the flat blades short carbon fibers and carbon fiber balls in the process of being formed. The vanes are disposed so as to scoop the short carbon fibers and carbon fiber balls.

The flat blades are rotated typically at 50–300 rpm and the rake-shaped vanes are rotated at a rotational speed 2–30 times that of the flat blades.

Examples of the mixer having such functions include a Loedige mixer of Gebrueder Loedige Maschinenbau GmbH.

EXAMPLES

The present invention will next be described in detail by way of examples, which should not be construed as limiting the invention. The bulk density of carbon fiber balls was measured in the following manner: carbon fiber balls (about 500 cm$^3$) were placed into a glass beaker (diameter 87 mm, capacity 500 cm$^3$); slight pressure was applied so as to fill the beaker with the balls; and subsequently the pressure was released. The bulk density ($\rho_B$) was calculated from the final volume of the carbon fiber balls (V (cm$^3$)) and the weight (W (g)) by use of the following equation: $\rho_B = W/V$ (g/cm$^3$).

Example 1

Short carbon fibers (40 kg, product of Kureha Chemical Industry Co., Ltd.: C-103T, average fiber length=about 3 mm, average fiber diameter=18 μm) were charged into a Loedige mixer (Gebrueder Loedige Maschinenbau GmH: Type FKM1600D, capacity 1.6 m³) and the rake-shaped vanes and the flat blades were simultaneously rotated at 3,000 rpm and 150 rpm respectively for 40 minutes to thereby form balls of short carbon fibers. Subsequently, mineral oil (Kaydol oil, 7 kg) was added while the flat blades alone were rotated at 150 rpm, and the blades were further rotated for ten minutes after completion of addition, to thereby impregnate the spherical short carbon fibers with the binder.

The resultant carbon fiber balls had a diameter of 3–10 mm and a bulk density of 0.05 g/cm³.

Incorporation of the thus-obtained carbon fiber balls into a resin successfully afforded a molded resin product containing short carbon fibers at uniform dispersion.

Example 2

Subsequent to the process of Example 1, the following steps were performed: a propylene resin powder (8 kg, Moplen, grain size 200–800 μm) was added to the binder-impregnated carbon fiber balls and the flat blades were rotated at 150 rpm for 1 minute to thereby obtain carbon fiber balls containing the resin powder. The obtained carbon fiber balls had a diameter of 3–10 mm and a bulk density of 0.06 g/cm³. The carbon fiber balls were successfully fed continuously and constantly at a constant rate from a typical hopper to an extruder.

As described above, the carbon fiber balls of the present invention have a generally spherical shape and a high bulk density. Therefore, the fiber balls can be satisfactorily forwarded from a hopper to an extruder to enable quantitative and constant feed to an extruder, etc. Moreover, the binder binds the short carbon fibers to one another and also binds the resin powder to the short carbon fibers to prevent breaking up of the carbon fiber balls and detachment of the short carbon fibers and the resin powder from the carbon fiber balls during storage, transportation, or handling of the carbon fiber balls for feed to a hopper. In addition, the binder works as a lubricant to increase lubrication between the short carbon fibers during the step of dispersion of the carbon fiber into the matrix of resin through kneading of the carbon fiber balls and the resin by an extruder, etc. Therefore, the short carbon fibers can be uniformly dispersed in the resin matrix with ease.

Furthermore, an additive for plastics such as a plasticizer, a stabilizer, an antioxidant, a UV-absorber, an antistatic agent, a flame-retardant, or a lubricant is incorporated in the binder to impart a variety of functions to the composite obtained by the addition of carbon fiber balls to a resin.

The carbon fiber balls of the present invention are also preferably used in the manufacture of automotive interior materials of resin products having a resin matrix in which short carbon fibers are dispersed so as to form decorative patterns, as well as in the manufacture of carbon-fiber-containing composite plastics that benefit from the properties of short carbon fibers, such as structural parts, sliding parts, and electrically conductive parts.

What is claimed is:

1. A process for making a carbon fiber ball comprising the steps of:

(a) introducing short carbon fibers having a diameter of 5–30 μm and a fiber length of 1–30 mm into a mixer provided with a plurality of rotatable substantially flat blades and a plurality of rotatable substantially rake-shaped vanes;

(b) simultaneously rotating the substantially flat blades and the substantially rake-shaped vanes;

(c) adding a binder to the content of the mixer; and thereafter (d) rotating only the substantially flat blades for a time sufficient to form a binder-impregnated carbon fiber ball having a bulk density of 0.05–0.15 g/cm³.

2. A process for making a carbon fiber ball according to claim 1, which additionally comprises the step of (e) bringing a resin powder into contact with the binder-impregnated carbon fiber ball.

3. A process for making a carbon fiber ball according to claim 2, wherein the binder-impregnated carbon fiber ball comprises 100 parts by weight of the short carbon fibers, 5-50 parts by weight of a resin power, and 5-50 parts by weight of the binder.

4. A process for making a carbon fiber ball according to claim 2, wherein step (e) includes rotating only the substantially flat blades to bring the binder-impregnated carbon ball into contact with the resin powder.

5. A process for making a carbon fiber ball according to claim 1 or 2, wherein the mixer comprises a substantially horizontally disposed hollow cylindrical container, and wherein the substantially flat blades and substantially rake-shaped vanes are rotatable about a substantially horizontal axis within the container.

6. A process for making a carbon fiber ball according to claim 1, wherein the binder-impregnated carbon fiber ball has a diameter of 3–15 mm.

7. A process for making a carbon fiber ball according to claim 1, wherein the short carbon fibers comprise pitch-based carbon fibers obtained by centrifugal spinning.

8. A process for making a carbon fiber ball according to claim 1, wherein the binder comprises a mineral oil.

9. A process for making a carbon fiber ball according to claim 1 wherein the binder-impregnated carbon fiber ball comprises 100 parts by weight of the short carbon fibers and 5-50 parts by weight of the binder.

* * * * *

UNITED STATES PATENT AND TRADEMARK OFFICE
CERTIFICATE OF CORRECTION

PATENT NO.   : 6,194,071 B1
DATED        : February 27, 2001
INVENTOR(S)  : Katsuto Takano et al.

It is certified that error appears in the above-identified patent and that said Letters Patent is hereby corrected as shown below:

<u>Title page,</u>
Item [73], Assignee: change Assignees to read: -- Kureha Chemical Industry Co., Ltd (JP) and Palmarole AG (CH) --

Signed and Sealed this

Eighth Day of October, 2002

Attest:

Attesting Officer

JAMES E. ROGAN
*Director of the United States Patent and Trademark Office*